US012579771B2

(12) United States Patent
Tokutake

(10) Patent No.: US 12,579,771 B2
(45) Date of Patent: Mar. 17, 2026

(54) INFORMATION PROCESSING DEVICE, INFORMATION PROCESSING METHOD, AND PROGRAM

(71) Applicant: NS Solutions Corporation, Tokyo (JP)

(72) Inventor: Masato Tokutake, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 279 days.

(21) Appl. No.: 18/278,980

(22) PCT Filed: Nov. 10, 2021

(86) PCT No.: PCT/JP2021/041341
§ 371 (c)(1),
(2) Date: Aug. 25, 2023

(87) PCT Pub. No.: WO2022/208973
PCT Pub. Date: Oct. 6, 2022

(65) Prior Publication Data
US 2024/0135668 A1 Apr. 25, 2024
US 2024/0233306 A9 Jul. 11, 2024

(30) Foreign Application Priority Data

Mar. 31, 2021 (JP) ................................. 2021-060118

(51) Int. Cl.
*G06V 10/25* (2022.01)
*G06T 7/13* (2017.01)
(Continued)

(52) U.S. Cl.
CPC ................ *G06V 10/25* (2022.01); *G06T 7/13* (2017.01); *G06T 7/62* (2017.01); *G06V 10/761* (2022.01); *G06V 2201/07* (2022.01)

(58) Field of Classification Search
None
See application file for complete search history.

(56) References Cited

U.S. PATENT DOCUMENTS 9,468,152 B1 * 10/2016 Jens ......................... A01G 3/08
2014/0314280 A1 10/2014 Lee et al.
(Continued)

FOREIGN PATENT DOCUMENTS

CN 104881626 A 9/2015
CN 106407880 A 2/2017
(Continued)

OTHER PUBLICATIONS

Real-Time Fruit Recognition and Grasping Estimation for Robotic Apple Harvesting (Year: 2020).*
(Continued)

*Primary Examiner* — Chan S Park
(74) *Attorney, Agent, or Firm* — ArentFox Schiff LLP

(57) ABSTRACT
The present invention is to predict a production amount of a target object with higher accuracy.
An information processing device that predicts a production amount of a target object, the information processing device including: an area extraction module configured to extract a target object area in which the target object exists in a photographed image of the target object photographed by a photographing device; a correction module configured to correct a size of the target object area on the basis of a distance from the photographing device to the target object, detected by a distance sensor; and a prediction module configured to predict the production amount of the target object on the basis of a size of the target object area corrected by the correction module.

11 Claims, 13 Drawing Sheets

(51) Int. Cl.
  *G06T 7/62*    (2017.01)
  *G06V 10/74*   (2022.01)

(56)     References Cited

U.S. PATENT DOCUMENTS

| | | | |
|---|---|---|---|
| 2016/0035136 A1* | 2/2016 | Sendai .............. | G02B 27/0172 |
| | | | 345/633 |
| 2018/0025480 A1 | 1/2018 | Dingle et al. | |
| 2022/0129675 A1* | 4/2022 | Takimoto .............. | G06V 10/25 |
| 2022/0130036 A1* | 4/2022 | Gatto ........................ | G06T 7/70 |

FOREIGN PATENT DOCUMENTS

| | | |
|---|---|---|
| CN | 206193829 U | 5/2017 |
| CN | 111914664 A | 11/2020 |
| CN | 111914668 A | 11/2020 |
| JP | 2002136223 A | 5/2002 |
| JP | 2020054289 A | 4/2020 |

OTHER PUBLICATIONS

Supplementary European Search Report issued by the European Patent Office in European Patent Application No. 21933490.1, dated Mar. 10, 2025.

Monga, Tanya, "Estimating Vineyard Grape Yield from Images", Canadian Conference on AI (2018). [Lecture Notes in Computer Science, Springer, Berlin, Heidelberg, pp. 339-343, XP047472498, ISBN: 978-3-540-74549-5.

Santos, Thiago T., "Grape detection, segmentation, and tracking using deep neural networks and three-dimensional association", Computer and Electronics in Agriculture, Feb. 7, 2020, vol. 170, 105247 XP086072271, ISSN: 0168-1699, DOI: 10.1016/J.COMPAG.2020.105247.

NSSOL Stories, NS Solutions Corporation, Internet: <URL: https://www.nssol.nipponsteel.com/future/stories/ai-wine.html>, non-official translation (How Will AI Change Winemaking?Suntory and NSSOL Predict Grape Yields.), Feb. 3, 2021.

Internet: <URL: https://diamond.jp/articles/-/215297?page=2>, non-official translation (Accepting the Challenges of Smart Agriculture, Part 1: The Quest to Create Fermentation Grape Cultivation Methods That Exist Nowhere Else in the World. Diamond Online. Weekly [Shukan] Diamond.) Nov. 1, 2019.

Doi, Shinichi et al. A Study on Prediction of Harvest Time using Multi-Spectral Imaging and Machine Learning. IPSJ Symposium Series: Multimedia, Distributed, Cooperative and Mobile Symposium (DICOMO2017), Jun. 21, 2017, pp. 207-212.

Internet: <URL: https://www.jstage.jst.go.jp/article/jcshokuriku/6/0/6_KJ00002444521/_pdf/-char/ja>, (The Hokuriku Crop Science), non-official translation (Kouta, Mitsuyoshi et al. 2-3 Cases of Actual Yield Measurement Surveys for Grapes.) Mar. 25, 1972, vol. 6, pp. 21-24.

International Search Report and Written Opinion in corresponding International Patent Application No. PCT/JP2021/041341 mailed Dec. 14, 2021.

Written Opinion in corresponding International Patent Application No. PCT/JP2021/041341 mailed Feb. 15, 2022.

Office Action and Search Report issued by the Chinese Patent Office in European Patent Application No. 2021800966195, dated Jun. 27, 2025 (English translation of Office Action).

Tiantian, Lou, et al., "Grape cluster detection and segmentation based on deep convolutional networks", Journal of Shanxi Agricultural University (Natural Science Edition), 2020, pp. 109-119, vol. 40, No. 5.

Tong, Yang, "Robot target calibration based on multi-sensor fusion", Electronic Journal of China Mater's Degree Thesis, Full-Text.

\* cited by examiner

10

200

210

100

INFORMATION
PROCESSING
DEVICE

| POSITION INFORMATION (PHOTOGRAPHING POSITION, PHOTOGRAPHING DIRECTION) | PHOTOGRAPHED IMAGE | DISTANCE IMAGE |
|---|---|---|
| ... | ... | ... |

30

INFORMATION PROCESSING DEVICE, INFORMATION PROCESSING METHOD, AND PROGRAM

CROSS-REFERENCE TO RELATED APPLICATIONS

The present Application for Patent is a National Stage Entry of International Application No. PCT/JP2021/041341, filed Nov. 10, 2021, which claims priority to Japanese Patent Application No. 2021-060118, filed Mar. 31, 2021. The disclosures of the priority applications are incorporated in their entirety by reference herein.

TECHNICAL FIELD

The present invention relates to an information processing device, an information processing method, and a program.

BACKGROUND ART

It is important to grasp an amount of harvested crop in advance before harvest. By grasping the harvest amount before harvest, it is possible to efficiently prepare workers, work time, materials, equipment, and the like required at the time of harvest and to achieve systematic shipment.

As a technique for predicting the amount of harvested crop, Patent Literature 1 discloses a technique of calculating a first predicted amount of harvested crop on the basis of a crop cultivation plan, obtaining a correction value using a neural network, and calculating a predicted harvest amount in a prediction period on the basis of the correction value.

CITATIONS LIST

Patent Literature

Patent Literature 1: JP 2002-136223 A

SUMMARY OF INVENTION

Technical Problems

However, the technique of Patent Literature 1 has a problem in that prediction accuracy is not necessarily high.

The present invention has been made in view of such a problem, and an object thereof is to provide a technique for predicting a production amount of a target object with higher accuracy.

Solutions to Problems

In order to achieve the above object, the present invention is an information processing device that predicts a production amount of a target object, the information processing device including: an area extraction module configured to extract a target object area in which the target object exists in a photographed image of the target object photographed by a photographing device; a correction module configured to correct a size of the target object area on the basis of a distance from the photographing device to the target object, detected by a distance sensor; and a prediction module configured to predict the production amount of the target object on the basis of a size of the target object area corrected by the correction module.

In addition, another aspect is an information processing method executed by an information processing device that predicts a production amount of a target object, the information processing method including: an area extraction step of extracting a target object area in which the target object exists in a photographed image of the target object photographed by a photographing device; a correction step of correcting a size of the target object area on the basis of a distance from the photographing device to the target object, detected by a distance sensor; and a prediction step of predicting the production amount of the target object on the basis of a size of the target object area corrected at the correction step.

In addition, another aspect is a program for causing a computer that predicts a production amount of a target object to function as: an area extraction module configured to extract a target object area in which the target object exists in a photographed image of the target object photographed by a photographing device; a correction module configured to correct a size of the target object area on the basis of a distance from the photographing device to the target object, detected by a distance sensor; and a prediction module configured to predict the production amount of the target object on the basis of a size of the target object area corrected by the correction module.

Advantageous Effects of Invention

According to the present invention, the production amount of the target object can be predicted with higher accuracy.

BRIEF DESCRIPTION OF DRAWINGS

FIG. 6 is a diagram illustrating a data configuration example of an image table.

DESCRIPTION OF EMBODIMENTS

First Embodiment

Figure 1:
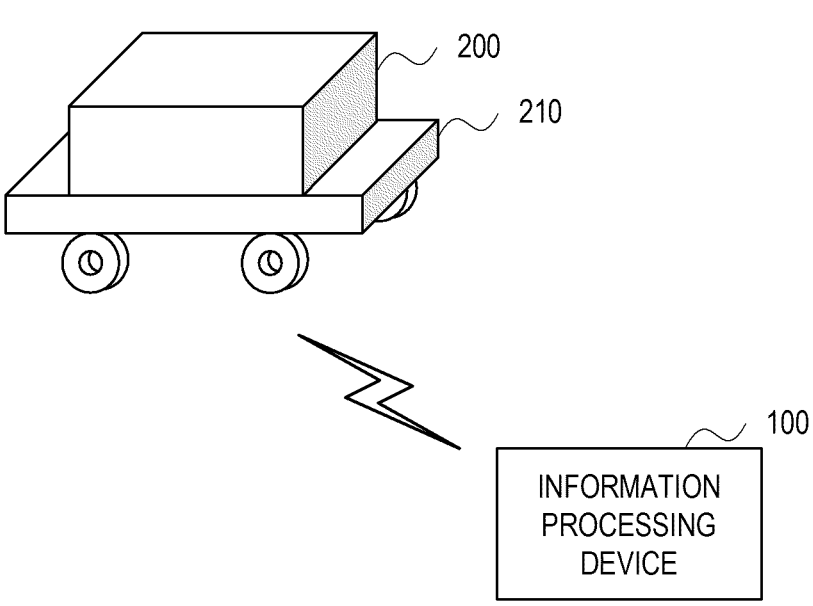
FIG. 1 is an overall view of an information processing system.

FIG. 1 is an overall view of an information processing system 10 according to a first embodiment. The information processing system 10 includes an information processing device 100, a photographing unit 200, and a wheeled platform 210. The information processing device 100 and the photographing unit 200 can communicate with each other in a wired or wireless manner via a network. On the basis of photographed images of grapes photographed in a field, the information processing device 100 predicts an amount of harvested grapes in the entire field. Here, the field is an example of a prediction area in which a production amount is to be predicted. In addition, the grapes are an example of a target object to be a prediction target. Moreover, the harvest amount is an example of the production amount.

The photographing unit 200 is mounted on the wheeled platform 210, and photographs images of grapes from different positions along with movement of the wheeled platform 210. Furthermore, as well as photographing the images of the grapes, the photographing unit 200 acquires a distance image in a photographing range corresponding to a photographed image, and position information of the photographing unit 200 at the time of photographing the photographed image. The photographing unit 200 transmits these pieces of information to the information processing device 100.

Figure 2:
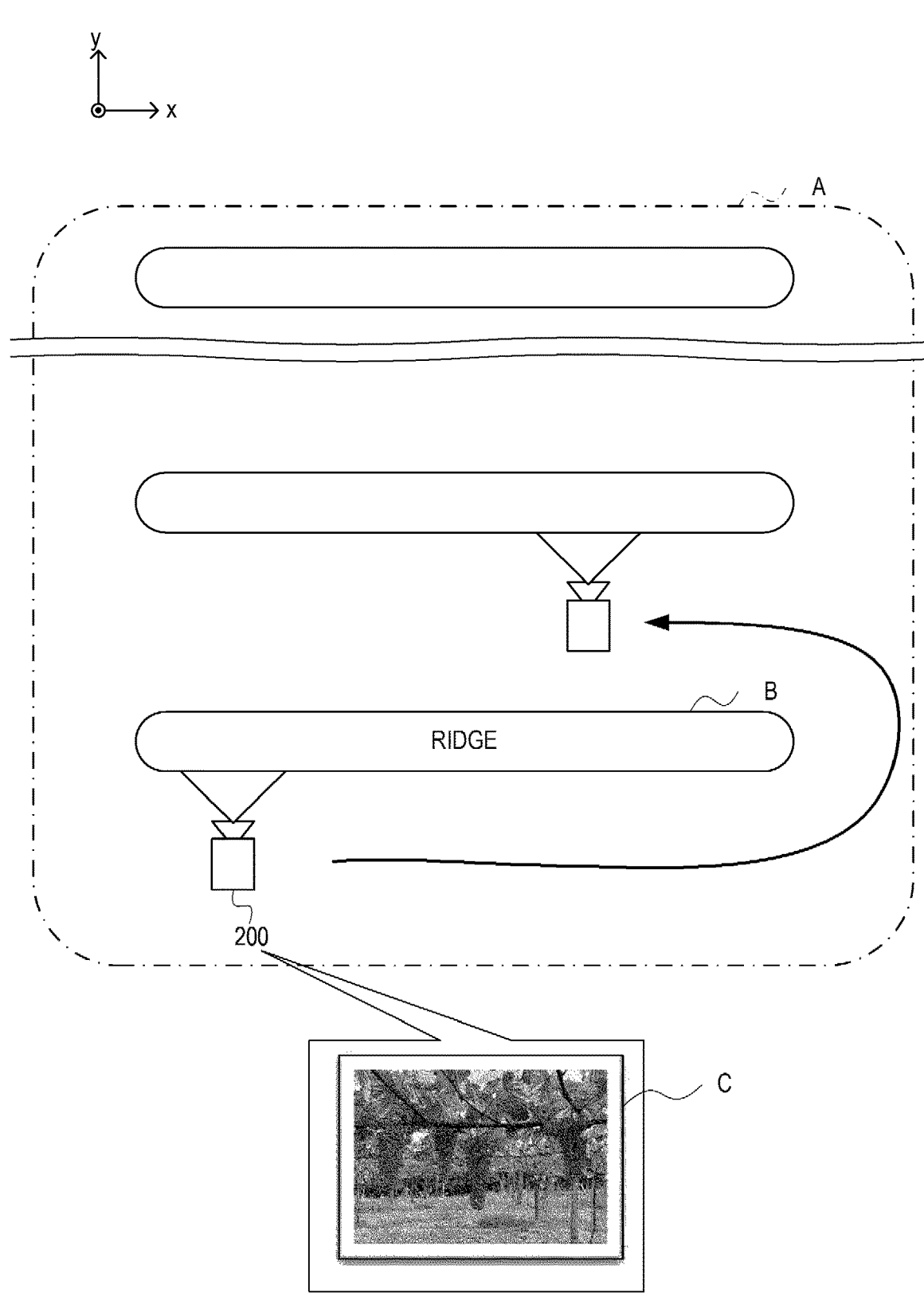
FIG. 2 is a schematic view illustrating processing by a photographing unit.

FIG. 2 is a schematic view illustrating processing by the photographing unit 200. In the present embodiment, a field A is provided with a plurality of ridges B. In the present embodiment, a longitudinal direction of the ridges B is defined as an x-axis, and a direction perpendicular to the longitudinal direction of the ridges B is defined as a y-axis. In addition, a vertical direction (height direction of the field A) is defined as a z-axis. Moreover, a right direction of the paper surface of FIG. 2 is defined as a plus direction of the x-axis, an upper direction of the paper surface of FIG. 2 is defined as a plus direction of the y-axis, and a front direction of the paper surface of FIG. 2 is defined as a plus direction of the z-axis.

The photographing unit 200 photographs the ridges B in a direction substantially parallel to the plus direction of the y-axis as a photographing direction while moving beside the ridges B. Note that one photographed image C includes only a part of one ridge B, and the photographing unit 200 photographs the entire field A by photographing a plurality of photographed images. Note that a moving direction and a moving speed of the wheeled platform 210 are controlled according to operations of a user.

Figure 3:
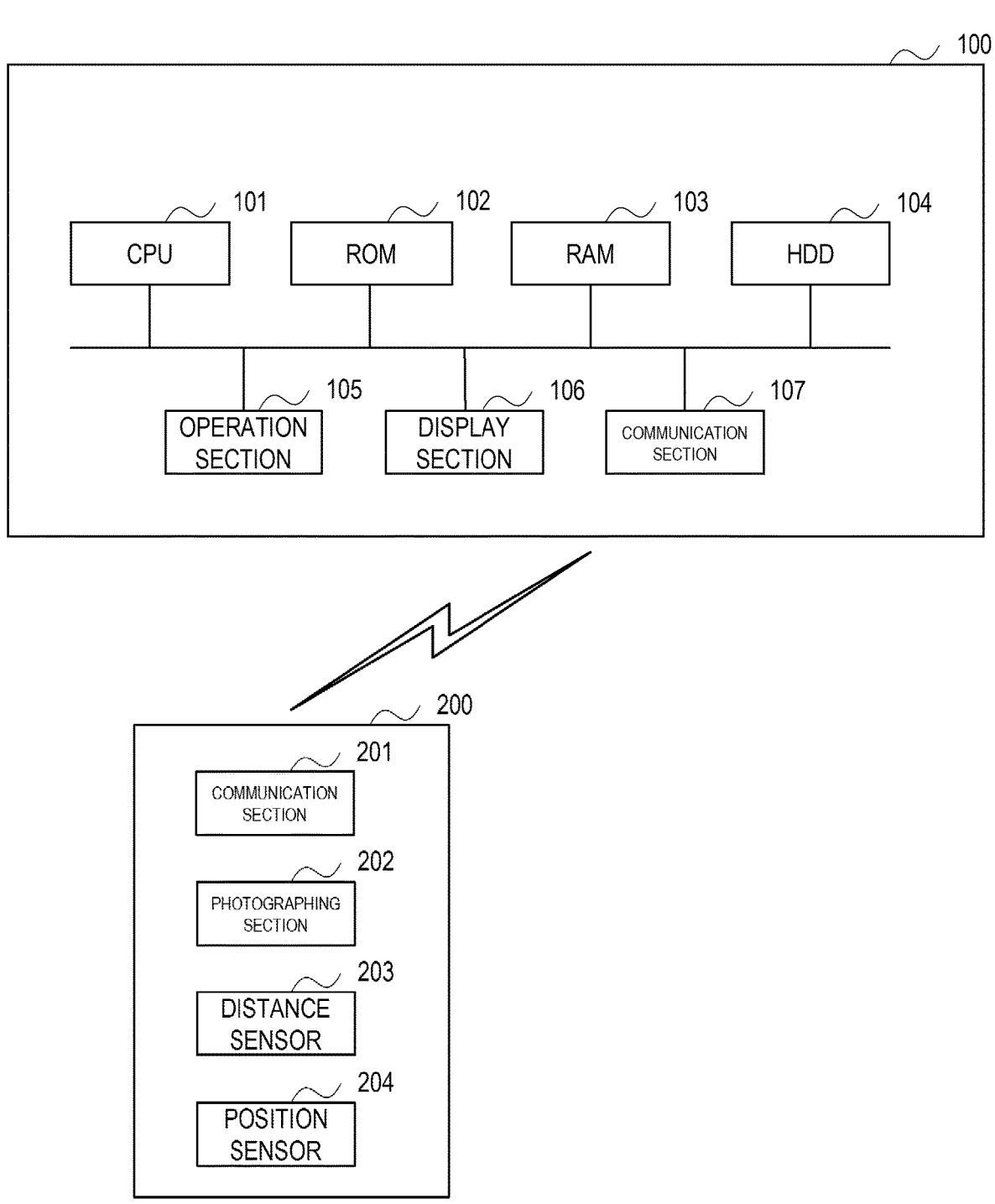
FIG. 3 is a hardware configuration diagram of an information processing device and the photographing unit.

FIG. 3 is a hardware configuration diagram of the information processing device 100 and the photographing unit 200. The information processing device 100 includes a CPU 101, a ROM 102, a RAM 103, an HDD 104, an operation section 105, a display section 106, and a communication section 107. The CPU 101 reads a control program stored in the ROM 102 and executes various processing. The RAM 103 is used as a temporary storage area such as a main memory and a work area of the CPU 101. The HDD 104 stores various data, various programs, and the like. The operation section 105 includes a keyboard and a mouse, and receives various operations by a user. The display section 106 displays various information. The communication section 107 communicates with an external device such as the photographing unit 200 via the network.

The photographing unit 200 includes a communication section 201, a photographing section 202, a distance sensor 203, and a position sensor 204. The communication section 201 communicates with an external device such as the information processing device 100 via the network. The photographing section 202 photographs an image. Specifically, the photographing section 202 photographs a photographed image (RGB image) with visible light. The distance sensor 203 includes a plurality of LEDs that project light and a plurality of light receiving elements, and acquires a two-dimensional distance image indicating a distance between the distance sensor 203 and an object. Examples of the distance sensor 203 include a time-of-flight camera. The position sensor 204 is a tracking camera including an acceleration sensor and a gyrosensor, and detects a relative position and direction of the photographing unit 200 on the basis of a predetermined position and direction. Note that the position sensor 204 may include another device capable of providing visual-simultaneous localization and mapping (V-SLAM), such as a stereo camera, for example.

The photographing section 202, the distance sensor 203, and the position sensor 204 acquire the photographed image, the distance image, and the position information at the same timing, respectively. Note that this timing is referred to as the time of photographing in the following. Here, the position information includes the relative position and direction. The photographing unit 200 periodically acquires the photographed image, the distance image, and the position information, and transmits these pieces of information to the information processing device 100 via the communication section 201 every time the photographing unit 200 acquires these pieces of information. As another example, the photographing unit 200 may collectively transmit the plurality of photographed images and the like to the information processing device 100 after completion of photographing of the entire field A.

Figure 4:
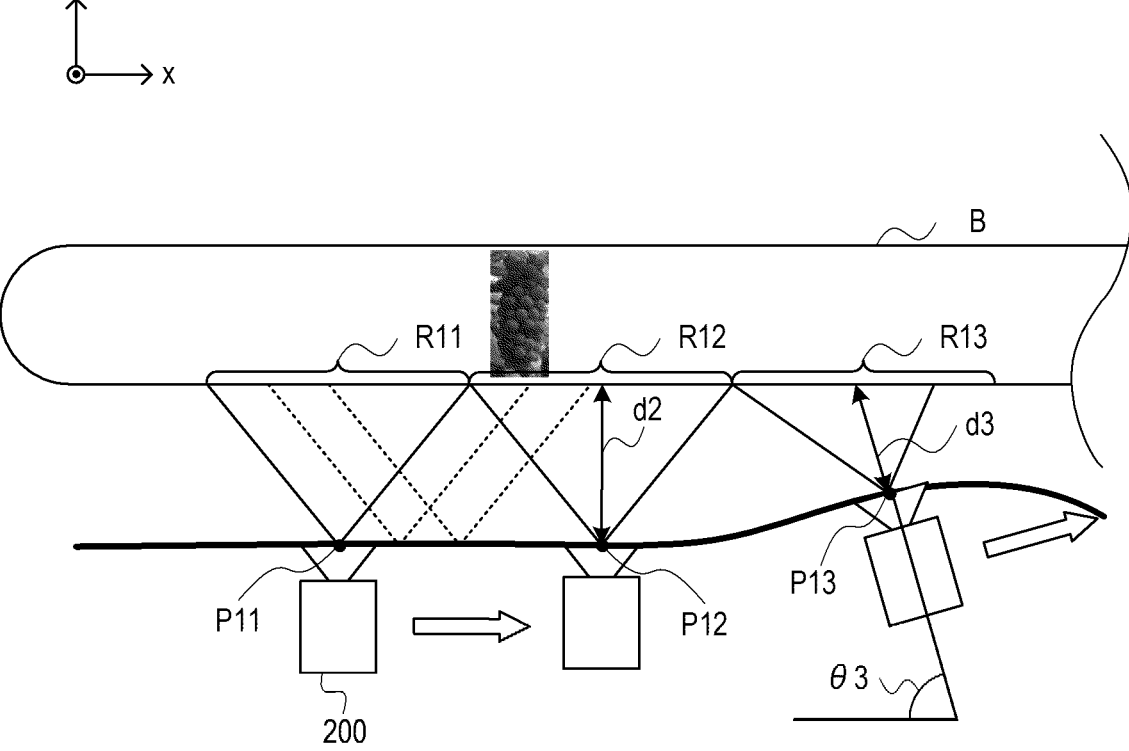
FIG. 4 is an explanatory view of a photographing position and a photographing direction of the photographing unit.

FIG. 4 is an explanatory view of a photographing position and a photographing direction of the photographing unit 200. As described above, the photographing unit 200 acquires the photographed image, distance image, and position information of the ridges B while moving along the ridges, that is, along the x-axis. However, since an obstacle such as unevenness of the ground surface or stones exists on a movement route, the photographing unit 200 actually moves along the direction of the x-axis while shifting in the plus or minus direction of the y-axis. Therefore, as illustrated in FIG. 4, the y-axis direction is basically the photographing direction, but the photographing direction deviates from the y-axis direction depending on the moving direction and orientation of the photographing unit 200. The position sensor 204 of the present embodiment acquires the photographing direction as an angle $\theta 3$ formed with the x-axis. Since the position information includes the photographing position and the photographing direction as described above, the photographing range in the photographed image and the distance image, and the distance in the distance image can be correctly specified. Note that the distance image at a photographing position P12 indicates a distance along the y-axis as indicated by d2, and the distance image at a photographing position P13 indicates a distance in a direction of the angle $\theta 3$ formed with the x-axis, as indicated by d3.

In addition, the photographing unit 200 photographs a plurality of images at a timing at which the photographing ranges partly overlap with each other. Note that such timing control is achieved by controlling the moving speed of the wheeled platform 210 and a photographing speed (frame rate). By obtaining the photographed images at a frequency at which the photographing ranges partly overlap with each other as described above, it is possible to leave no area unphotographed in the field A, that is, in the prediction area.

In the present embodiment, in the height direction, that is, in the z-axis direction, the whole area in the height direction of the ridge is adjusted to fall within the photographing range of one photographed image.

Figure 5:
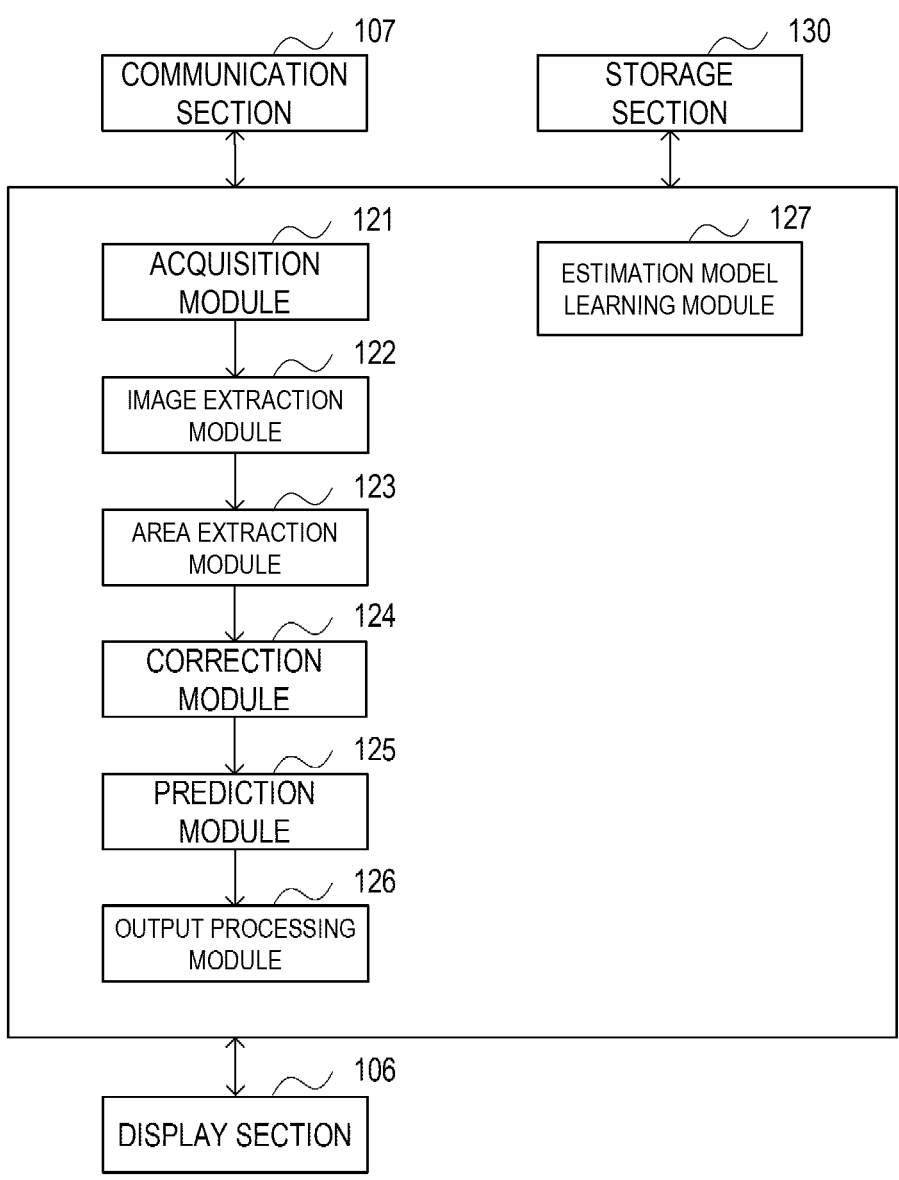
FIG. 5 is a functional configuration diagram of the information processing device.

FIG. 5 is a functional configuration diagram of the information processing device 100. The information processing device 100 includes, as a functional configuration, an acquisition module 121, an image extraction module 122, an area extraction module 123, a correction module 124, a prediction module 125, an output processing module 126, and an estimation model learning module 127. Note that these functions are implemented by the CPU 101 reading a program stored in the ROM 102 or the HDD 104 and executing the program. That is, the processing described as being executed by the above-described modules is process- ing executed by the CPU 101. In addition, as another example, the above-described functions and processing may be implemented by the CPU 101 reading a program stored in a recording medium such as an SD card instead of the ROM 102 or the like, and executing the program.

The acquisition module 121 acquires the photographed image, the distance image, and the position information from the photographing unit 200, and stores these pieces of information in association with each other in an image table 131 of a storage section 130. The storage section 130 is the HDD 104 or the like. FIG. 6 is a diagram illustrating a data configuration example of the image table 131 of the storage section 130. The image table 131 stores the photographed image, the distance image, and the position information obtained at the same timing, in association with each other as one record. Furthermore, the image table 131 stores a plurality of the records corresponding to the plurality of distance images and the like photographed by the photo- graphing unit 200. As a result, the CPU 101 can specify the distance in a depth direction in the photographed image and the photographing position.

The image extraction module 122 extracts the photo- graphed image as a processing target from the storage section 130. Hereinafter, the photographed image as the processing target is referred to as a target image. The area extraction module 123 extracts the area of the grapes as the target object in each target image. Hereinafter, the area of the grapes is referred to as a target object area. The correction module 124 corrects the size of the target object area. The prediction module 125 predicts the amount of harvested grapes in the entire field A, that is, the production amount of the target object in the prediction area on the basis of the corrected size of the target object area. The output process- ing module 126 causes the display section 106 to display various information. Note that the detailed processing by the above-described functional modules will be described in detail below with reference to a flowchart illustrated in FIG. 6. The estimation model learning module 127 learns (gen- erates) an estimation model to be referred to when the area extraction module 123 extracts the target object area. The processing of the estimation model learning module 127 will be described in detail later.

Figure 7:
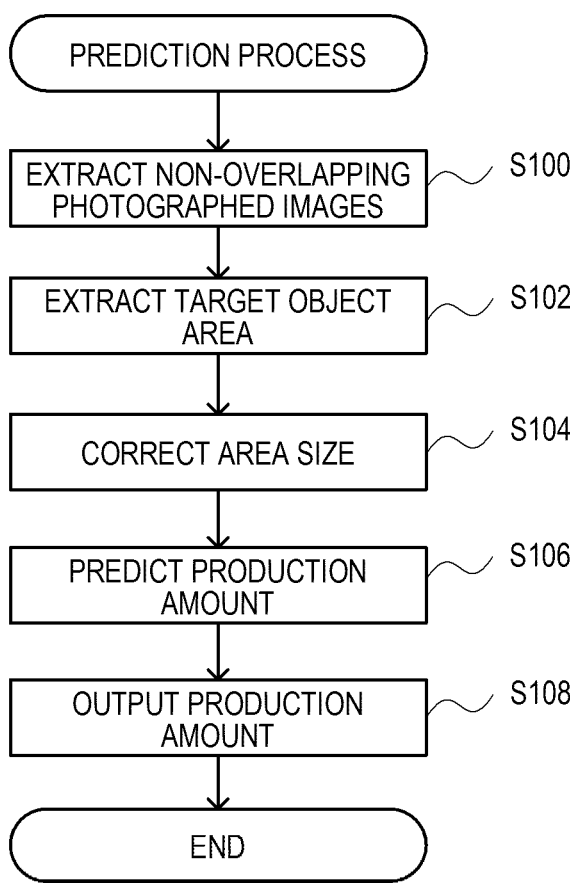
FIG. 7 is a flowchart illustrating a prediction process.

FIG. 7 is a flowchart illustrating a prediction process by the information processing device 100. This process is executed after the photographing of the entire field A by the photographing unit 200 is completed and the plurality of photographed images are stored in the storage section 130. First, at step S100, the image extraction module 122 extracts a plurality of the target images from the storage section 130 in the x-axis direction such that the photographing ranges do not overlap with each other and there is no unphotographed area in the field. That is, the image extraction module 122 extracts, as the target images, the photographed images having no gap between the respective photographing ranges and having no overlap between the respective photographing ranges. As a result, the images of the entire field with no overlap are extracted as the target images.

For example, in the example illustrated in FIG. 4, it is assumed that the photographed image corresponding to a photographing range R11, photographed at a photographing position P11 is extracted as a first target image. In this case, the photographed image corresponding to a photographing range R12 in contact with the photographing range R11 is extracted as a next target image. Note that the image extraction module 122 specifies the photographing range on the basis of the photographing position and the photograph- ing direction indicated in the position information associated with the photographed image. Similarly, the photographed image corresponding to a photographing range R13 in contact with the photographing range R12 is extracted as a next target image. The photographing ranges R12 and R13 are specified by the photographing positions P12 and P13 and the photographing directions, respectively.

For the photographing range in the y-axis direction, the image extraction module 122 similarly extracts, as the target images, the photographed images having no overlap and no gap between the respective photographing ranges. The image extraction module 122 refers to not only the position information but also the distance image in the determination of the presence or absence of the overlap and the presence or absence of the gap of the photographing ranges in the y-axis direction.

The description returns to FIG. 7. After the processing of step S100, at step S102, the area extraction module 123 extracts the target object areas from all the target images extracted at step S100. The area extraction module 123 uses the estimation model for estimating the target object in the extraction of the target object area. The estimation model is a deep learning model learned using actually photographed images of grapes. In the present embodiment, the estimation model is learned by the estimation model learning module 127 and stored in the storage section 130 before the start of the prediction process.

Next, at step S104, the correction module 124 corrects the size of each target object area obtained at step S102. Even for the same target object, the target object area becomes smaller as the target object is located at a deeper position in the depth direction of photographing. The correction module 124 corrects such a size difference of the target object caused by the position in the depth direction (photographing direc- tion). The correction module 124 uses, for example, a position of the ridge B closest to the photographing unit 200 as a reference position. The correction module 124 corrects the size of each target object area to a size in a case in which this target object area exists at the position closest to the photographing unit 200 according to a difference between the reference position and the position of each target object area in the photographing direction. Note that relationship information indicating a relationship between a distance from the reference position in the photographing direction and a coefficient for correction is stored in the storage section 130 in advance. The correction module 124 corrects the target object area on the basis of the relationship infor- mation and the distance of the target object area indicated in the distance image included in the position information associated with the photographed image as an extraction source of the target object area.

Next, at step S106, the prediction module 125 predicts the entire harvest amount in the field A, that is, the prediction range, on the basis of the sizes of all the target object areas corrected at step S104. Specifically, the prediction module 125 first obtains the sum of the sizes from the sizes of all the target object areas corrected at step S104. Then, the predic- tion module 125 refers to a regression model to convert the sum of the sizes into a weight. Here, the obtained weight is a predicted value of the harvest amount. The regression model is a relational expression that defines a relationship between the size and the weight.

Figure 8:
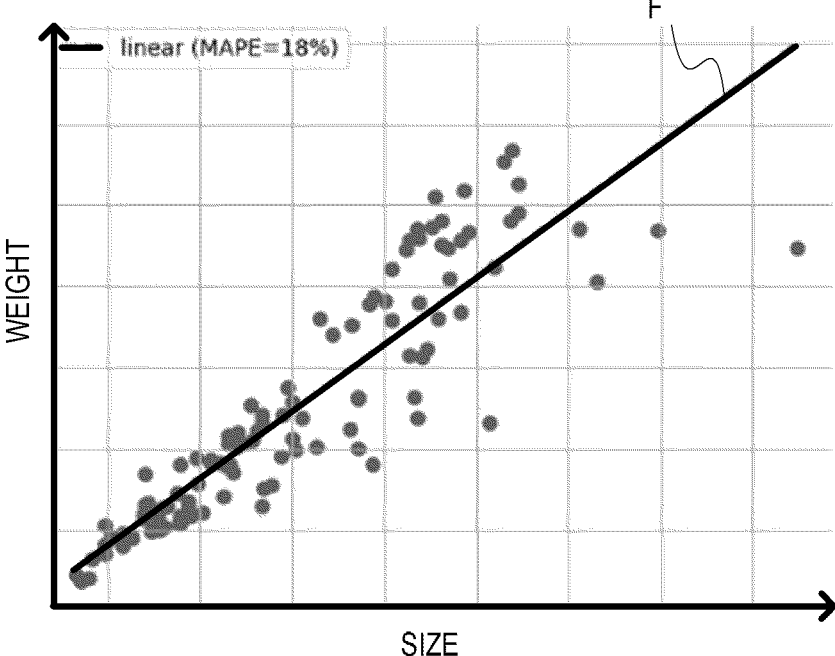
FIG. 8 is an explanatory view of a regression model.

The regression model will be described with reference to FIG. 8. In a graph illustrated in FIG. 8, the horizontal axis represents the size of the target object area at the reference position, and the vertical axis represents the actual weight of the target object. In this manner, there is a correlation between the size and weight (production amount) of the target object area. The regression model is a relational expression obtained on the basis of such actual measured values. Note that a relational expression F is obtained from FIG. 8. The regression model is stored in the storage section 130. The regression model of the present embodiment is an example of the first regression model.

Next, at step S108, the output processing module 126 outputs the harvest amount obtained at step S106. Specifically, the output processing module 126 causes the display section 106 to display the harvest amount. The prediction process is thus completed.

Figure 9:
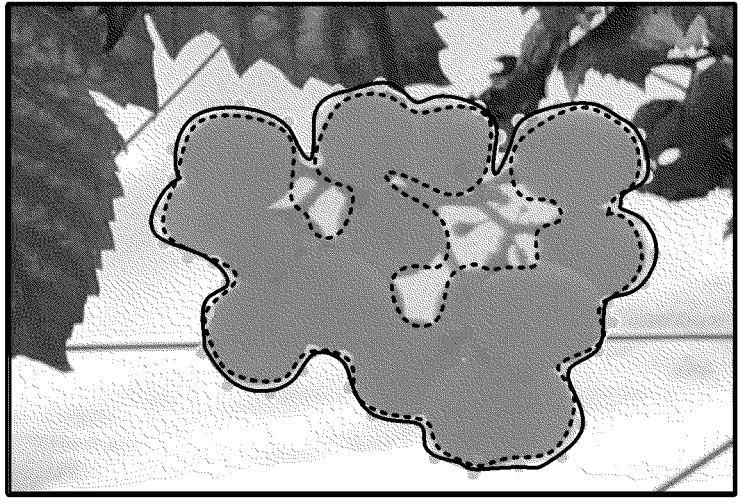
FIG. 9 is an explanatory view of an estimation model.
Figure 10:
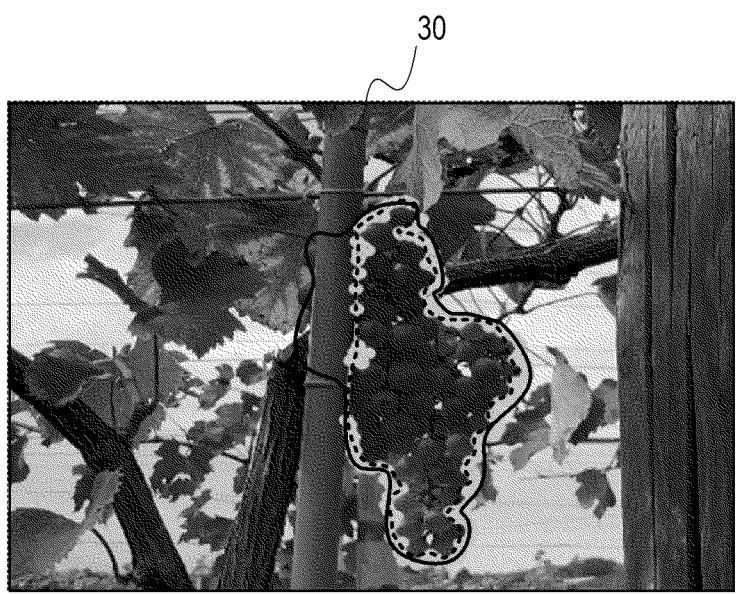
FIG. 10 is an explanatory view of the estimation model.

Next, the process of learning the estimation model by the estimation model learning module 127 will be described with reference to FIGS. 9 and 10. At the time of learning the estimation model, annotation is performed manually in the photographed image of the target object. In this case, the annotated area varies depending on individuals such that one person designates an area indicated by a dotted line in FIG. 9 as the target object area, whereas another person designates an area indicated by a solid line in FIG. 9 as the target object area. Such variations may cause a decrease in the accuracy of the learning model. On the other hand, the estimation model learning module 127 of the present embodiment generates the learning model by the following processing.

That is, the estimation model learning module 127 inputs (applies) the annotated photographed image to, for example, three learning models for testing (for learning). In a case where a result of inference based on the learning models satisfies any one of condition 1 and condition 2 described below, the estimation model learning module 127 performs automatic modification as indicated by modification 1 and modification 2, respectively.

> Condition 1 "annotated area AND area that has not been inferred as target object in any learning model"
> Correction 1 "modified as area not to be annotated"
> Condition 2 "non-annotated area AND area that has been inferred as target object in any learning model"
> Modification 2 "modified as area to be annotated"

By using not a single model but an ensemble of a plurality of models as described above, the probability of erroneous automatic modification can be reduced.

Furthermore, the estimation model learning module 127 repeats the processing until a modification amount becomes equal to or less than a certain value by, for example, inputting the photographed image in which the annotated area has been modified by the above processing to the three learning models for testing again. As a result, it is possible to obtain learning data annotated with an equivalent standard. The estimation model learning module 127 learns the estimation model by using the learning data obtained in this manner. This makes it possible to obtain the estimation model with higher estimation accuracy.

Furthermore, Random Erasing is adopted for learning the estimation model of the present embodiment. As a result, a correct shape considering occlusion (hidden surface) can be predicted by the estimation model. For example, even in a case where a part of the target object is hidden behind a support post 30 as illustrated in FIG. 10, a correct shape considering occlusion is predicted as indicated by a solid line without being estimated to be smaller than an actual size as indicated by a dotted line.

As described above, since the information processing device 100 of the present embodiment specifies the target object areas on the basis of the plurality of photographed images having no overlap and including the entire range of the prediction area, it is possible to specify the target object areas in a non-overlapping manner. Furthermore, since the information processing device 100 corrects the size of the target object area on the basis of the distance image, it is possible to specify a more accurate size of the target object area. Furthermore, the information processing device 100 can predict the production amount by converting the size of the target object area into the weight with the use of the regression model. In this manner, the information processing device 100 can predict the harvest amount (production amount) of the target object with higher accuracy than before.

As a first modification of the first embodiment, the non-overlapping photographed images may be extracted at the time of photographing by the photographing unit 200. In this case, the information processing device 100 receives the photographed image, the distance image, and the position information every time the photographing unit 200 performs the photographing. Every time the acquisition module 121 acquires the photographed image, the image extraction module 122 determines whether or not the acquired photographed image is a photographed image that does not overlap the photographed image most-recently selected as the target image and has the same boundary. The image extraction module 122 extracts this photographed image as the target image in a case where the photographed image does not overlap the target image and has the same boundary. In a case where the photographed image overlaps the target image, the photographed image is deleted from the storage section 130. By extracting the target image in real time at the time of photographing, and deleting images other than the target image from the storage section 130 as described above, the memory of the storage section 130 can be effectively utilized.

Furthermore, as a second modification, in a case where the photographed image does not overlap the target image and there is a gap between the photographed image and the target image in the first modification, it is determined that the photographing position has moved too far, and a photographing instruction to photograph the photographing range returned by a predetermined distance may be displayed on the display section 106. In this case, a photographing person can obtain the photographed image that does not overlap the target image and has the same boundary by performing photographing again after changing photographing conditions, such as moving the wheeled platform 220 in the minus direction of the x-axis with a remote controller or the like, or directing the photographing direction to a moving source.

In addition, as a third modification, the wheeled platform 210 may be a mobile system that can travel autonomously and communicate with the information processing device 100. In this case, the information processing device 100 may predict the photographing positions of the non-overlapping photographed images, and indicate the predicted photographing positions to the wheeled platform 210 to photograph the non-overlapping photographed images.

Second Embodiment

Figure 11:
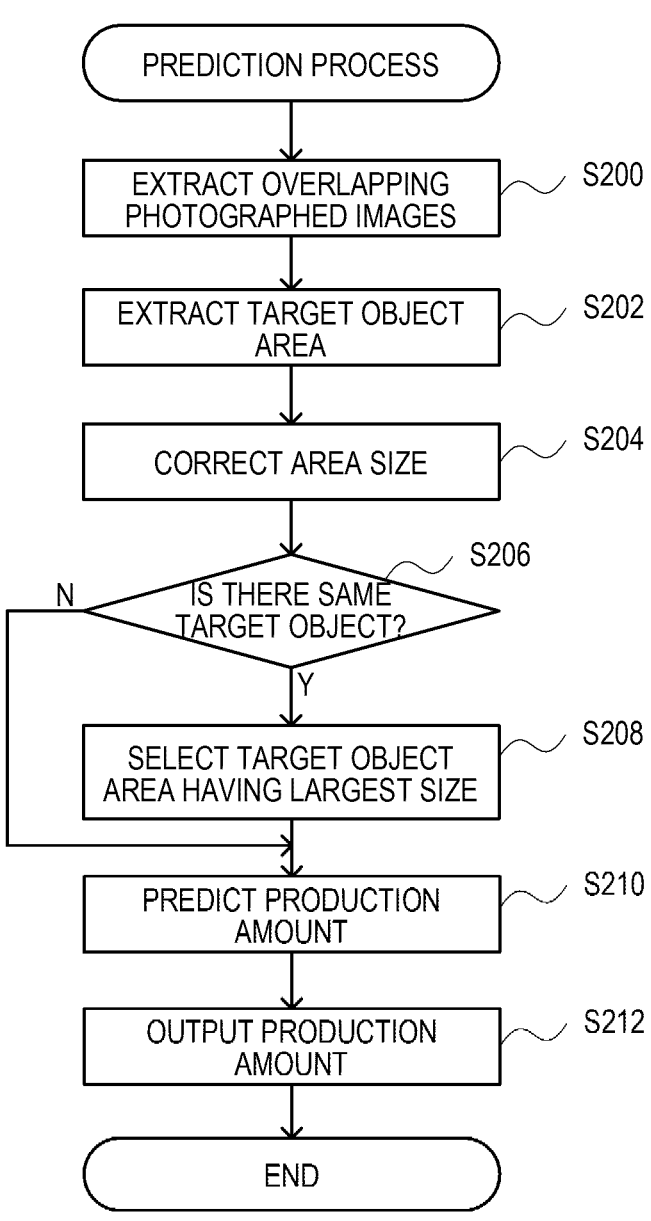
FIG. 11 is a flowchart illustrating a prediction process according to a second embodiment.

Next, differences of the information processing system 10 according to a second embodiment from the information processing system 10 according to the first embodiment will be mainly described. FIG. 11 is a flowchart illustrating a prediction process by the information processing device 100 according to the second embodiment. First, at step S200, the image extraction module 122 extracts a plurality of target images whose photographing ranges overlap with each other by a predetermined length in the x-axis direction. In the present embodiment, the image extraction module 122 extracts the plurality of target images whose photographing ranges overlap with each other by a half length in the x-axis direction of the photographing range.

Figure 12:
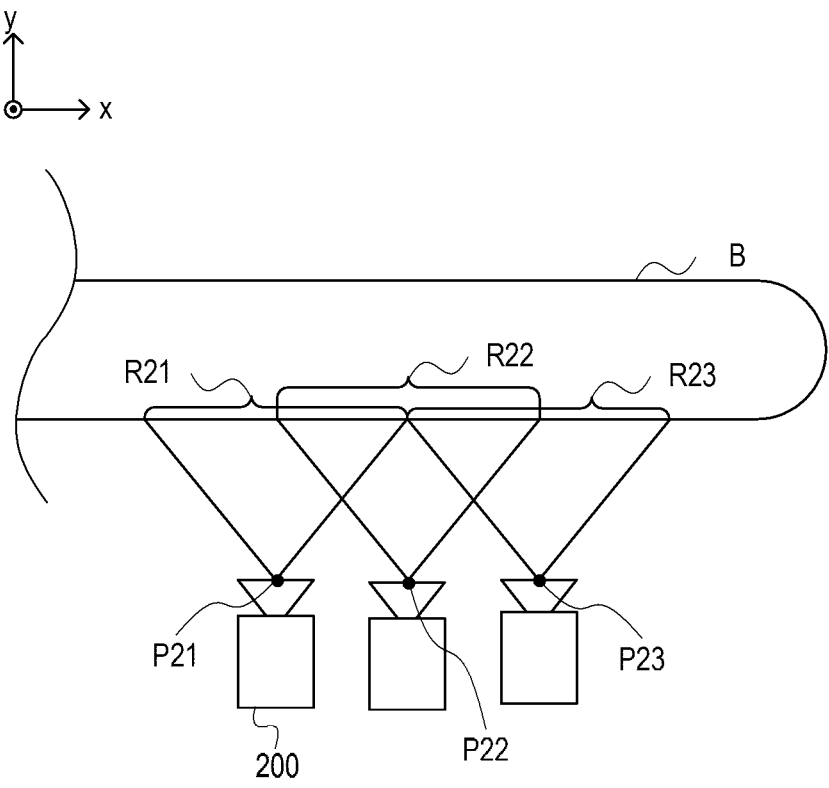
FIG. 12 is an explanatory view of a target image according to the second embodiment.

FIG. 12 is an explanatory view of the target image according to the second embodiment. In the example illustrated in FIG. 12, it is assumed that the photographed image corresponding to a photographing range R21 is extracted as a first target image. In this case, the photographed image corresponding to a photographing range R22 that overlaps the photographing range R21 by the half length in the x-axis direction of the photographing range is extracted as a next target image. Furthermore, as a next target image, the photographed image corresponding to a photographing range R23 that overlaps the photographing range R22 by the half length in the x-axis direction of the photographing range is extracted. Note that the photographing ranges R22 and R23 are specified by photographing positions P22 and P23 and the photographing directions, respectively.

The description returns to FIG. 11. After the processing of step S200, at step S202, the area extraction module 123 extracts the target object areas in all the target images extracted at step S200. Next, at step S204, the correction module 124 corrects the sizes of the target object areas. The processing at step S202 and the processing at step S204 are similar to the processing at step S102 and the processing at step S104 described with reference to FIG. 7, respectively.

Next, at step S206, the prediction module 125 checks whether or not a plurality of target object areas corresponding to the same target object are included in the plurality of target object areas extracted at step S202. In this processing, the prediction module 125 determines whether or not the target objects are the same on the basis of the position information (photographing position and photographing direction) associated with each target object area. In a case where the plurality of target object areas corresponding to the same target object are included (Y at step S206), the prediction module 125 proceeds to step S208. In a case where the plurality of target objects corresponding to the same target object are not included in the plurality of target object areas (N at step S206), the prediction module 125 proceeds to step S210.

At step S208, the prediction module 125 selects the largest target object area among the plurality of target object areas corresponding to the same target object, as the target object area corresponding to this target object. For example, it is assumed that there are a plurality of target object areas corresponding to a target object T1 existing at one position X1, and there are a plurality of target object areas corresponding to a target object T2 existing at another position X2. In this case, the prediction module 125 selects the largest target object area for each of the target objects T1 and T2. As described above, in a case where the plurality of same target objects exist, the prediction module 125 selects the largest target object area for each target object. For example, in a case where a part of the target object is hidden by a leaf, a branch, or the like in the photographed image, a range smaller than the actual size of the target object is extracted as the target object area. Therefore, in a case where the plurality of target object areas for the same target object have different sizes, it is considered that the largest target object area has the least hidden portion and is close to the actual target object.

Next, at step S210, the prediction module 125 predicts the harvest amount of the entire field by converting the corrected sizes of all the target object areas into a weight with the use of the regression model. This processing is similar to the processing at step S106 (FIG. 7). Note that the target object area selected at step S208 is adopted for the target object for which the plurality of target object areas have been extracted. Next, at step S212, the output processing module 126 causes the display section 106 to display the harvest amount. This processing is similar to the processing at step S108 (FIG. 7). Note that other configurations and processing of the information processing system 10 according to the second embodiment are similar to those of the information processing system 10 according to the first embodiment.

As described above, in a case where the same target object is included in different photographed images having overlapping photographing ranges, the information processing device 100 of the second embodiment predicts the production amount using the larger target object area. As a result, the production amount can be predicted with higher accuracy.

A first modification of the second embodiment will be described. In the present embodiment, the plurality of photographed images in which halves of the photographing ranges overlap are extracted, but the degree of overlapping is not limited to a half. As another example, the information processing device 100 may extract the plurality of photographed images whose photographing ranges overlap with each other by a length longer than a half in the x-axis direction. This increases the possibility that the same target object is included in three or more photographed images. The information processing device 100 can estimate the size of the target object with higher accuracy by selecting the largest target object area among the plurality of photographed images.

Figure 13:
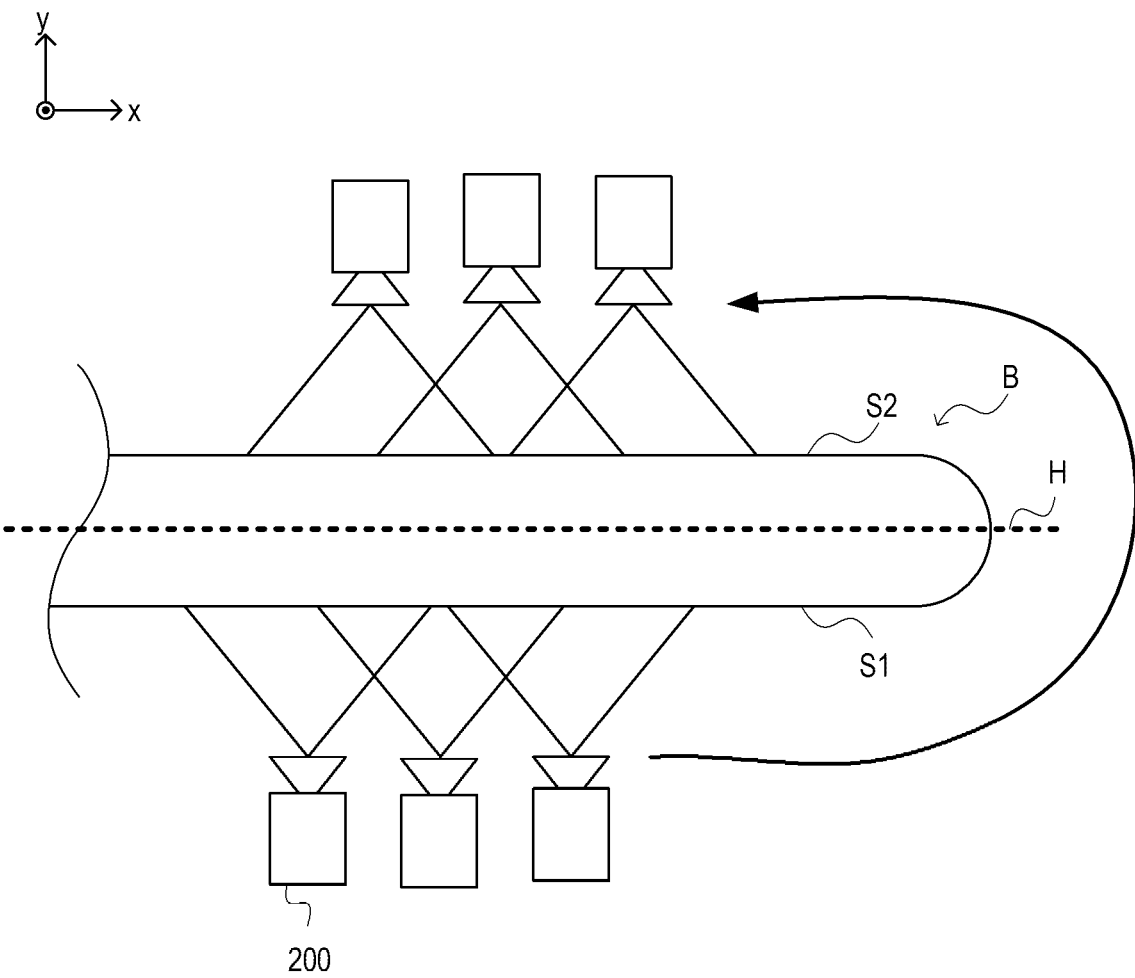
FIG. 13 is an explanatory view of a second modification of the second embodiment.

A second modification will be described. The photographing unit 200 may acquire a first photographed image and a second photographed image respectively obtained by photographing the same area of the ridge B in a first boundary surface direction from the outside of a first boundary surface of the ridge B and in a second boundary surface direction from the outside of a second boundary surface of the ridge B. For example, the photographing unit 200 photographs a first boundary surface S1 (main surface) of the ridge B illustrated in FIG. 13 in the plus direction of the y-axis as the photographing direction. Thereafter, the photographing unit 200 photographs a second boundary surface S2, which is a back surface of the ridge B with respect to the first boundary surface S1, in the minus direction of the y-axis as the photographing direction. As a result, the photographing unit 200 can obtain the first photographed image and the second photographed image described above. The information processing device 100 extracts the first photographed image and the second photographed image having overlapping photographing ranges in the x-axis direction. In a case where the target object areas corresponding to the same target object are included in the first photographed image and the second photographed image, the information processing device 100 selects the larger target object area. As a result, the production amount can be predicted using the target object area with less occlusion.

A third modification will be described. As described in the second modification, the photographing unit 200 acquires the first photographed image and the second photographed image. The information processing device 100 extracts the target object area by setting a first distance range from the first boundary surface S1 of the ridge B included in the first photographed image to a half H of the ridge B in the depth direction, that is, in the y-axis direction, as the processing target. Similarly, the information processing device 100 extracts the target object area by setting a second distance range from the second boundary surface S2 of the ridge B included in the second photographed image to the half H of the ridge B in the depth direction, as the processing target. As a result, the information processing device 100 can predict the production amount using the target object area having a lower possibility of occlusion. Note that the sum of the first distance range and the second distance range is a distance from the first boundary surface S1 to the second boundary surface S2.

The above embodiments are merely examples for carrying out the present invention, and various other embodiments can be adopted. For example, various modifications and changes can be made within the scope of the gist of the present invention described in the claims, such as applying a modification of one embodiment to another embodiment.

As a first modification of the above embodiments, a system may be adopted in which some of the functions of the information processing device 100 are achieved by a plurality of devices. In addition, some configurations of the above-described embodiments may be omitted, or the order of processing may be changed or omitted. In the present embodiment, the photographing unit 200 includes the photographing section 202, the distance sensor 203, and the position sensor 204 in one device (photographing unit 200), but at least one of them may be another device. In this case, each device includes a communication section, and each device transmits the detection result obtained in synchronization to the information processing device 100 via a network.

In addition, as a second modification, the prediction area only needs to be a preset area, and is not limited to the whole of a certain field. For example, in a case where a plurality of crops are cultivated in a field, one kind of crop may be set as the target object, and an area where this crop is cultivated may be set as the prediction area.

As a third modification, the target object is not limited to the grapes. Other crops such as fruits and vegetables, trees in forests, and the like may be used.

As a fourth modification, in the present embodiments, the photographing unit 200 performs photographing by linearly moving along the linearly formed ridge B as the prediction area. However, the shape of the prediction area is not limited to that in the embodiments. The movement track of the photographing unit 200 is also not limited to that in the embodiments. The photographing unit 200 only needs to photograph the photographed images of the prediction area while moving along the boundary surface of the prediction area.

As a fifth modification, the position sensor 204 of the photographing unit 200 detects the relative position and direction, but for the position, an absolute position measured by a global navigation satellite system (GNSS) may be detected instead of the relative position.

As a sixth modification, the output form of the harvest amount is not limited to that in the embodiments. As another example, the harvest amount may be transmitted to an external device via a network.

As a seventh modification, the information processing device 100 does not have to include the estimation model learning module 127. In this case, the estimation model is learned in another device, transmitted to the information processing device 100 via a network, and stored in the storage section 130.

As an eighth modification, the information processing device 100 may use the image extraction algorithm at step S200 described with reference to FIG. 11 for acquiring the learning data as well. As a result, the photographed images of the target object photographed from various angles can be acquired as the learning data.

As a ninth modification, in the regression model, the variable for deriving the weight is not limited to the size of the target object area. As another example, the information processing device 100 may use a regression model that specifies the weight from at least one of four variables of barycentric coordinates of the target object area, an inclination of the target object, the photographing position (the position of the photographing device), and the photographing direction of the photographing device, in addition to the size of the target object area. Here, the barycentric coordinates of the target object area and the inclination of the target object can be specified by image recognition in the distance image, the position information, and the photographed image.

In addition, as another example, the information processing device 100 may obtain the volume of the target object from the target object area and predict the production amount using a regression model indicating a relationship between the volume and the weight. In this case, the information processing device 100 calculates three-dimensional voxel coordinates of a surface of the target object (bunch), and maps the voxel coordinates on a 3D map. At this time, the information processing device 100 smoothly connects the measured voxel coordinates by appropriately interpolating a missing bunch surface voxel that has not been measured due to occlusion. The information processing device 100 then specifies the number of voxels inside a 3D figure expressed by the voxel coordinates of the bunch surface, as the volume. The regression model of this example is an example of the second regression model.

As a tenth modification, in the present embodiments, the entire range in the height direction of the prediction area can be photographed in one photographed image. However, in a case where it is difficult to photograph the entire range of the prediction area in the height direction (z-axis direction), the photographing unit 200 performs photographing so as to cover the entire range in the height direction as well as in the x-axis direction. The information processing device 100 of the first embodiment extracts the photographed images that do not overlap with each other not only in the x-axis direction but also in the height direction. In addition, the information processing device 100 of the second embodiment extracts the photographed images that overlap with each other not only in the x-axis direction but also in the height direction. As described above, the information processing device 100 may perform the above processing by setting the photographed images photographed while being shifted not only one-dimensionally but also two-dimensionally, as the processing measure.

As an eleventh modification, the information processing device 100 may predict the production amount of the target object included in one photographed image.

Furthermore, the above-described device, computer-executed program, and method may be implemented as a single device or may be implemented by using components shared by a plurality of devices, and include various aspects. In addition, the above-described device, computer-executed program, and method can be changed as appropriate such that they are partly software and partly hardware. Furthermore, the invention is also achieved as a recording medium for a program for controlling the device. Of course, the recording medium for the program may be a magnetic recording medium or a semiconductor memory, and can be considered in exactly the same manner in any recording medium to be developed in the future.

REFERENCE SIGNS LIST

10 Information processing system
100 Information processing device
101 CPU
102 ROM
103 RAM
104 HDD
105 Operation section
106 Display section
107 Communication section
121 Acquisition module
122 Image extraction module
123 Area extraction module
124 Correction module
125 Prediction module
126 Output processing module
127 Estimation model learning module
130 Storage section
200 Photographing unit
201 Communication section
202 Photographing section
203 Distance sensor
204 Position sensor
210 Wheeled platform

The invention claimed is:

1. An information processing device that predicts a production amount of a target object, the information processing device comprising:

a memory; and a processor coupled to the memory, the processor being configured to:

extract a target object area in which the target object exists in a photographed image of the target object photographed by a photographing device;

correct a size of the target object area on a basis of a distance from the photographing device to the target object, detected by a distance sensor;

predict the production amount of the target object on a basis of a size of the target object area corrected;

extract, the target object area, from each of a plurality of the photographed images, each having a photographing range, the photographic ranges at least partly overlapping with each other, the plurality of photographed images being photographed by the photographing device moving in a predetermined direction, when at least two of the plurality of photographed images include an image of the target object existing at a same position, select a largest target object area among a plurality of the target object areas corresponding to the target object existing at the same position, as the target object area of the target object existing at the same position;

wherein the processor further configured to extract a first photographed image photographed from an outside of a first boundary surface of the prediction area and a second photographed image photographed from an outside of a second boundary surface, the second boundary surface being on a back side of the first boundary surface, and when the first photographed image and the second photographed image include the image of the target object existing at the same position, select a larger target object area from the two target object areas corresponding to the target object existing at the same position as the target object area of the target object existing at the same position, and predicts the production amount on a basis of a size of the selected target object area.

2. The information processing device according to claim 1, wherein the processor is further configured to extract the target objection area from each of a plurality of the photographed images corresponding to different photographing ranges in a prediction area in which the production amount is to be predicted and including an entire range in the prediction area, and extracts the target object area in the photographed image as the processing target, and predict the production amount of the target object in the prediction area on a basis of a size of each of a plurality of the target object areas corrected.

3. The information processing device according to claim 1, wherein the plurality of photographed images are images photographed under a different condition of at least one of a photographing position and a photographing direction, and wherein the processor further is configured to specify a photographing range corresponding to each of the photographed images photographed by the photographing device on a basis of the photographing position and the photographing direction of each photographed image, and extract a plurality of the photographed images whose photographing ranges overlap with each other by a predetermined length in a predetermined direction from a storage section in which the photographed images photographed by the photographing device are stored, as target images from which the target object area is to be extracted, on a basis of the photographing range.

4. The information processing device according to claim 1, wherein the processor further configured to extract the target object area from the photographed image using an estimation model of the target object, and the estimation model is generated by:

applying learning data to a plurality of learning models, the learning data being a plurality of photographed images for learning including an annotated area as the target object, and modifying the annotated area on a basis of a result of estimation by each learning model and the annotated area.

5. The information processing device according to claim 1, wherein the processor further configured to extract a first photographed image photographed from an outside of a first boundary surface of the prediction area and a second photographed image photographed from an outside of a second boundary surface, the second boundary surface being on a back side of the first boundary surface, the processor further configured to extract the target object area existing in a range of a first distance from the first boundary surface toward the second boundary surface among target objects included in the first photographed image, and further extracts the target object area existing in a range of a second distance from the second boundary surface toward the first boundary surface, and a sum of the first distance and the second distance is a distance between the first boundary surface and the second boundary surface.

6. The information processing device according to claim 1, wherein the processor is further configured to predict the production amount using a first regression model obtained from data on the size and the production amount of the target object.

7. The information processing device according to claim 6, wherein the first regression model indicates a relationship between the production amount and at least one of a barycentric coordinate of the target object, an inclination of the target object, a position of the photographing device, and a photographing direction of the photographing device, and wherein the processor is further configured to predict the production amount on a basis of the first regression model and at least one of the barycentric coordinate, the inclination, the position, and the photographing direction.

8. The information processing device according to claim 1, wherein the processor is further configured to obtain a volume of the target object area on a basis of a size of the target object area and a three-dimensional position of the target object area obtained from a distance image, and predicts the production amount using a second regression model obtained from data on the volume and the production amount of the target object.

9. An information processing method executed by an information processing device that predicts a production amount of a target object, the information processing method comprising:

an area extraction step of extracting a target object area in which the target object exists in a photographed image of the target object photographed by a photographing device;

a correction step of correcting a size of the target object area on a basis of a distance from the photographing device to the target object, detected by a distance sensor; and a prediction step of predicting the production amount of the target object on a basis of a size of the target object area corrected at the correction step, wherein at the area extraction step, extracting the target object area from each of a plurality of photographed images, each having a photographic range, the photographing ranges at least partly overlapping with each other, are set as the a processing target, the plurality of photographed images being photographed by the photographing device moving in a predetermined direction, and at the prediction step, when at least two of the plurality of photographed images include an image of the target object existing at a same position, a largest target object area among a plurality of the target object areas corresponding to the target object existing at a same position, is selected as the target object area of the target object existing at the same position, wherein the information processing method further comprises an extraction step of extracting a first photographed image photographed from an outside of a first boundary surface of the prediction area and a second photographed image photographed from an outside of a second boundary surface, the second boundary surface being on a back side of the first boundary surface, and when the first photographed image and the second photographed image include the image of the target object existing at the same position, selecting a larger target object area from the two target object areas corresponding to the target object existing at the same position as the target object area of the target object existing at the same position, and predicting the production amount on a basis of a size of the selected target object area.

10. A non-transitory computer-readable recording medium storing a program for causing a computer to execute a process comprising:

extracting a target object area in which the target object exists in a photographed image of the target object photographed by a photographing device;

collecting a size of the target object area on a basis of a distance from the photographing device to the target object, detected by a distance sensor; and predicting a production amount of the target object on a basis of a size of the target object area corrected by the collecting, wherein the extracting, the target object area from each of a plurality of the photographed images, each having a photographic range, the photographing ranges at least partly overlapping with each other, the plurality of photographed images being photographed by the photographing device moving in a predetermined direction, and when at least two of the plurality of photographed images include an image of the target object, selecting a largest target object area among a plurality of the target object existing at a same position, areas corresponding to the target object existing at the same position, as the target object area of the target object existing at the same position, wherein the process comprises extracting a first photographed image photographed from an outside of a first boundary surface of the prediction area and a second photographed image photographed from an outside of a second boundary surface, the second boundary surface being on a back side of the first boundary surface, and when the first photographed image and the second photographed image include the image of the target object existing at the same position, selecting a larger target object area from the two target object areas corresponding to the target object existing at the same position as the target object area of the target object existing at the same position, and predicting the production amount on a basis of a size of the selected target object area.

11. The information processing device according to claim 1, wherein the plurality of photographed images overlap with each other in the predetermined direction by a range of a half or more of the photographing range.

* * * * *